(12) United States Patent
Takahashi et al.

(10) Patent No.: US 8,338,051 B2
(45) Date of Patent: Dec. 25, 2012

(54) ELECTRODE CATALYST FOR FUEL CELL, METHOD FOR PRODUCING THE SAME, AND FUEL CELL USING THE ELECTRODE CATALYST

(75) Inventors: Hiroaki Takahashi, Susono (JP); Yosuke Horiuchi, Kakegawa (JP); Takahiro Nagata, Kakegawa (JP); Tomoaki Terada, Kakegawa (JP); Toshiharu Tabata, Kakegawa (JP)

(73) Assignees: Toyota Jidosha Kabushiki Kaisha, Toyota-shi, Aichi-ken (JP); Cataler Corporation, Shizuoka (JP)

( * ) Notice: Subject to any disclaimer, the term of this patent is extended or adjusted under 35 U.S.C. 154(b) by 412 days.

(21) Appl. No.: 12/663,314

(22) PCT Filed: Jun. 11, 2008

(86) PCT No.: PCT/JP2008/061073
§ 371 (c)(1),
(2), (4) Date: Dec. 7, 2009

(87) PCT Pub. No.: WO2008/153189
PCT Pub. Date: Dec. 18, 2008

(65) Prior Publication Data
US 2010/0183942 A1 Jul. 22, 2010

(30) Foreign Application Priority Data

Jun. 11, 2007 (JP) .................. 2007-154060
Dec. 5, 2007 (JP) .................. 2007-314492

(51) Int. Cl.
| | |
|---|---|
| B01J 23/00 | (2006.01) |
| B01J 23/40 | (2006.01) |
| B01J 23/74 | (2006.01) |
| H01M 8/10 | (2006.01) |
| H01M 4/38 | (2006.01) |
| H01M 4/92 | (2006.01) |
| H01M 4/02 | (2006.01) |
| H01M 4/36 | (2006.01) |
| H01M 4/94 | (2006.01) |
| H01M 4/90 | (2006.01) |
| C22C 28/00 | (2006.01) |
| C22C 19/03 | (2006.01) |
| C22C 5/04 | (2006.01) |

(52) U.S. Cl. ........ 429/482; 429/485; 429/487; 429/524; 429/525; 429/526; 429/527; 502/182; 502/184; 502/185; 420/416; 420/455; 420/456; 420/461; 420/462; 420/463

(58) Field of Classification Search .............. 429/482, 429/485, 487, 524–527; 502/182, 184, 185; 420/416, 455, 456, 461–463, 465–468
See application file for complete search history.

(56) References Cited

U.S. PATENT DOCUMENTS

| | | | |
|---|---|---|---|
| 5,079,107 A * | 1/1992 | Jalan .................. | 429/498 |
| 6,649,300 B2 * | 11/2003 | Ito et al. .................. | 429/487 |
| 7,455,714 B2 | 11/2008 | Sato | |
| 7,955,755 B2 * | 6/2011 | McGrath et al. .............. | 429/524 |
| 7,988,834 B2 * | 8/2011 | Katori et al. .............. | 204/192.15 |
| 2004/0043283 A1 | 3/2004 | Cipollini et al. | |
| 2004/0224216 A1 | 11/2004 | Burlatsky et al. | |
| 2007/0184332 A1 * | 8/2007 | Park et al. .................. | 429/40 |
| 2007/0212591 A1 | 9/2007 | Miyazaki et al. | |
| 2009/0111681 A1 * | 4/2009 | Di Noto et al. ............ | 502/101 |
| 2009/0130518 A1 * | 5/2009 | Lee et al. .................. | 429/30 |
| 2009/0148740 A1 * | 6/2009 | Farag et al. .................. | 429/30 |
| 2010/0151296 A1 * | 6/2010 | Lee et al. .................. | 429/30 |

FOREIGN PATENT DOCUMENTS

| | | |
|---|---|---|
| EP | 2169749 A1 * | 3/2010 |
| JP | 61-8851 | 1/1986 |
| JP | 2001-118591 | 4/2001 |
| JP | 2002-15744 | 1/2002 |
| JP | 2002-246033 | 8/2002 |
| JP | 2002-289208 | 10/2002 |
| JP | 2004-087454 | 3/2004 |
| JP | 2005-538508 | 12/2005 |
| JP | 2006-045614 | 2/2006 |
| JP | 2006-49278 | 2/2006 |
| JP | 2006-102568 | 4/2006 |
| JP | 2006-236927 | 9/2006 |
| JP | 2006-294601 | 10/2006 |
| JP | 2006-318707 | 11/2006 |
| JP | 2007-12284 | 1/2007 |
| JP | 2007-59140 | 3/2007 |
| JP | 2007-141626 | 6/2007 |
| WO | WO 2005/117171 | 12/2005 |

OTHER PUBLICATIONS

Extended European Search Report for EP Application No. 08777294.3 dated Sep. 30, 2011.

* cited by examiner

*Primary Examiner* — Patricia L Hailey
(74) *Attorney, Agent, or Firm* — Finnegan, Henderson, Farabow, Garrett & Dunner, LLP

(57) ABSTRACT

This invention relates to an electrode catalyst for a fuel cell comprising catalyst metal particles of noble metal-base metal-Ce (cerium) ternary alloy carried on carbon materials, wherein the noble metal is at least one member selected from among Pt, Ru, Rh, Pd, Ag and Au, the base metal is at least one member selected from among Ir, Co, Fe, Ni and Mn, and the relative proportion (i.e., the molar proportion) of noble metal: base metal:Ce (cerium) is 20 to 95:5 to 60:0.1 to 3. The electrode catalyst for a fuel cell inhibits deterioration of an electrolyte membrane or an electrolyte in an electrode catalyst layer, improves durability, and, in particular, improves the capacity for power generation in the high current density region.

7 Claims, 1 Drawing Sheet

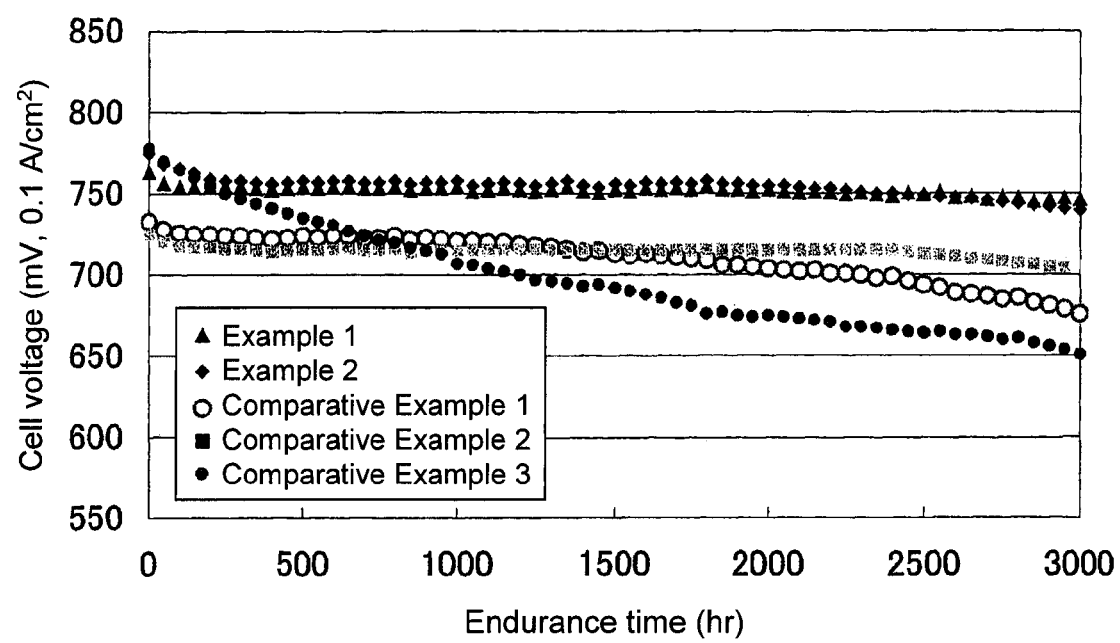

ELECTRODE CATALYST FOR FUEL CELL, METHOD FOR PRODUCING THE SAME, AND FUEL CELL USING THE ELECTRODE CATALYST

CROSS-REFERENCE TO RELATED APPLICATIONS

This application is a national phase application of International Application No. PCT/JP2008/061073, filed Jun. 11, 2008, and claims the priority of Japanese Application Nos. 2007-154060, filed Jun. 11, 2007, and 2007-314492, filed Dec. 5, 2007, the contents of all of which are incorporated herein by reference.

TECHNICAL FIELD

The present invention relates to an electrode catalyst for a fuel cell having a high current density and high durability, a method for producing the same, and a fuel cell having such electrode catalyst.

BACKGROUND ART

In fuel cells, water is produced by a cell reaction as a product in principle. Fuel cells have therefore drawn attention as clean power generation systems without a substantially harmful influence on the earth's environment. For example, a polymer electrolyte fuel cell comprising a pair of electrodes on both sides of a polymer electrolyte membrane that conducts protons produces electromotive force by supplying hydrogen gas as a fuel gas to one of the electrodes (i.e., the fuel electrode: anode), and supplying oxygen gas or air as an oxidant to the other electrode (i.e., the air electrode: cathode).

The cell characteristics of polymer electrolyte fuel cells have been drastically improved by advances such as the following: (1) a polymer electrolyte membrane having high ion conductivity has been developed; and (2) catalyst-carrying carbon coated with an ion-exchange resin (the polymer electrolyte) consisting of a material that is the same as or different from that of the polymer electrolyte membrane is used as the constituent material of the electrode catalyst layer to form what is called a three-dimensional reaction site in the catalyst layer. In addition to the excellent cell characteristics described above, the polymer electrolyte fuel cell can readily be made smaller and lighter. Due to the characteristics described above, the polymer electrolyte fuel cell is expected to be put in practical use as a power source for mobile vehicles such as electrically powered cars or power sources for small cogeneration systems.

In general, the gas diffusion electrode used in a polymer electrolyte fuel cell consists of a catalyst layer, which contains catalyst-carrying carbon materials coated with said ion-exchange resin, and a gas diffusion layer, which not only supplies the reaction gas to the catalyst layer but also collects electrons. The catalyst layer has open areas consisting of micropores formed among secondary or tertiary carbon particles, which are constituents of the catalyst layer, and the open areas function as diffusion channels of the reaction gas. As such catalysts, noble metal catalysts, such as platinum or platinum alloy, that are stable in ion-exchange resin are generally used.

In the past, a polymer electrolyte fuel cell involved the use of catalysts comprising a noble metal, such as platinum or platinum alloy, carried on carbon black as cathode and anode catalysts of the electrode catalysts. In general, platinum-carrying carbon black is prepared by adding sodium bisulfate to an aqueous solution of platinic chloride, allowing the mixture to react with a hydrogen peroxide solution, preparing the carbon black particles to carry the resulting platinum colloids, washing the resultants, and heat-treating the resultants as needed. Electrodes of a polymer electrolyte fuel cell are prepared by dispersing platinum-carrying carbon black particles in a polymer electrolyte solution to prepare an ink, coating the gas diffusion substrate, such as a carbon paper, with the ink, and drying the substrate. The polymer electrolyte membrane is sandwiched between such two electrodes, followed by a hot press. Thus, a membrane electrode assembly (MEA) can be constructed.

Platinum is an expensive noble metal, and it is thus expected to exhibit satisfactory performance by a small amount thereof. Accordingly, work is proceeding with catalyst activity in smaller amounts of platinum. For example, JP Patent Publication (kokai) No. 2002-289208 (A) is intended to provide an electrode catalyst for a fuel cell having high durability by inhibiting growth of platinum particles during operation, and discloses an electrode catalyst comprising a conductive carbon material, metal particles carried thereon that are less likely to be oxidized than platinum under acidic conditions, and platinum covering the outer surface of the metal particles. Specifically, the publication exemplifies an alloy comprising platinum and at least one metal selected from among gold, chromium, iron, nickel, cobalt, titanium, vanadium, copper and manganese as the metal particle.

JP Patent Publication (kokai) No. 2002-15744 (A) is intended to provide a polymer fuel cell that has excellent cathode polarization properties and produces a high cell output, and disclose the catalyst layer of the cathode containing a metal catalyst selected from the group consisting of platinum and platinum alloy and a metal complex containing a given amount of iron or chromium to improve cathode polarization properties. Specifically, in a polymer electrolyte fuel cell in which the cathode comprises a gas diffusion layer and a catalyst layer located between the gas diffusion layer and the polymer electrolyte layer, the catalyst layer contains a noble metal catalyst selected from the group consisting of platinum and platinum alloy and a metal complex containing iron or chromium, and the content of the metal complex is 1 to 40 mol % of the combined quantity of the metal complex and the noble metal catalyst. Thus, the metal complex containing iron or chromium in the catalyst layer of the cathode can effectively reduce the overvoltage activated by the oxygen reduction reaction of the cathode. Consequently, the cathode polarization properties can be improved, and high cell output can be attained.

In a polymer electrolyte fuel cell, peroxides are generated in the catalyst layer formed at the interface between a polymer electrolyte membrane and an electrode through a cell reaction, and the generated peroxides are diffused and converted into peroxide radicals, which cause electrolytes to deteriorate. For example, a fuel is oxidized at the fuel electrode, and oxygen is reduced at the oxygen electrode in a fuel cell. When hydrogen is used as a fuel and an acidic electrolyte is used, an ideal reaction is represented by the following formulae (1) and (2).

Anode (hydrogen electrode): $H_2 \rightarrow 2H^+ + 2e^-$     (1)

Cathode (oxygen electrode): $2H^+ + 2e^- + (1/2)O_2 \rightarrow H_2O$     (2)

The hydrogen ions generated at the anode by the reaction represented by formula (1) permeate (diffuse through) the polymer electrolyte membrane in a hydrate state of $H^+$ ($XH_2O$), and the hydrogen ions that permeate the membrane are then subjected to the reaction represented by formula (2) at the cathode. The electrode reactions at the anode and at the cathode involve the use of the electrode catalyst layer that is in close contact with the polymer electrolyte membrane as the reaction site, and such reactions proceed at the interface between the catalyst in the electrode catalyst layer and the polymer electrolyte membrane.

In addition to the main reactions, however, side reactions take place in a real fuel cell. A typical example thereof is generation of hydrogen peroxide ($H_2O_2$). Although the mechanism thereof is not fully understood, a possible mechanism is as follows. That is, hydrogen peroxide can be generated at the hydrogen or oxygen electrode. At the oxygen electrode, for example, hydrogen peroxide is deduced to be generated in a manner represented by the following formula (3) through the incomplete reduction of oxygen.

$$O_2 + 2H^+ + 2e^- \rightarrow 2H_2O_2 \tag{3}$$

Oxygen that is contained as a contaminant or intentionally included in gas at the hydrogen electrode or oxygen that is dissolved in an electrolyte at the oxygen electrode and diffused through the hydrogen electrode is considered to be associated with the reaction, and such reaction is considered to be represented by a formula identical to said formula (3) or the following formula (4):

$$2M-H + O^{2-} \rightarrow 2M + H_2O_2 \tag{4}$$

wherein M is a catalyst metal used for the hydrogen electrode, and M-H is the catalyst metal trapping hydrogen. In general, a noble metal such as platinum (Pt) is used for a catalyst metal.

Hydrogen peroxide that is generated on such electrodes separates from the electrodes by diffusion or other means and migrates into an electrolyte. Hydrogen peroxide is a substance having a potent oxidizing power and oxidizes many types of organic matter that constitute an electrolyte. Although the detailed mechanism thereof has not been elucidated, it is often considered that hydrogen peroxide produces hydroxyl radicals, and such hydroxyl radicals function as direct reactants for oxidization. Specifically, the radicals generated by the reaction by such as following formula are considered to abstract hydrogen from the organic matter of an electrolyte or cleave another bond. The cause for radical generation has not yet been elucidated; however, contact with a heavy-metal ion is considered to result in catalyst activity. Further, radical generation is considered to be caused by heat, light, or the like.

$$H_2O_2 \rightarrow 2 \cdot OH$$

or $$H_2O_2 \rightarrow \cdot H + \cdot OOH$$

JP Patent Publication (kokai) No. 2001-118591 (A) discloses a technique to solve the abovementioned problem, wherein the technique can prevent deterioration of a fuel cell caused by radicals by adding a compound, which "degrades," "inactivates" and "traps and inactivates" radicals generated by permeated hydrogen, to the electrolyte. More specifically, transition metal oxides, such as manganese oxides, ruthenium oxides, cobalt oxides, nickel oxides, chromium oxides, iridium oxides or lead oxides, which catalytically degrade peroxides, are dispersed and incorporated into a polymer electrolyte. Alternatively, a stabilizer for peroxide, such as a tin compound, that inhibits generation of peroxide radicals may be dispersedly incorporated therein. Further, a compound having a phenolic hydroxyl group that traps and inactivates the generated peroxide radicals may be incorporated.

As mentioned in JP Patent Publication (kokai) No. 2002-289208 (A), when a noble metal/base metal alloy catalyst is used, a base metal, such as iron, that is a counterpart member material of a noble metal such as platinum is eluted during the use of a fuel cell, and it disadvantageously causes the durability of a fuel cell to deteriorate as a contaminant of an electrolyte.

As JP Patent Publication (kokai) No. 2002-15744 (A) discloses, when a metal complex having iron or chromium is used as a promoter, a high cell output can be attained at the initial stage. However, iron or chromium is eluted during the use of a fuel cell, and it disadvantageously causes the durability of a fuel cell to deteriorate as a contaminant of an electrolyte.

In the method disclosed in JP Patent Publication (kokai) No. 2001-118591 (A), comprising an addition of a compound that "degrades," "inactivates" and "traps and inactivates" radicals, peroxides are not sufficiently suppressed, and further technical development is needed to improve fuel cell durability.

JP Patent Publication (kokai) No. 2006-236927 (A) discloses the invention in which a membrane electrode junction for a solid polymer fuel cell having high power generation performance and capable of generating power stably for a long time contains a catalyst comprising an alloy of platinum and at least one metal selected from among cerium and manganese on a carbon carrier in the catalyst layer of either an anode or cathode. Specifically, this publication discloses a Pt/Ce catalyst and a Pt/Mn catalyst.

Similarly, JP Patent Publication (kokai) No. 2006-102568 (A) discloses a Pt/M catalyst (wherein M represents at least one member selected from a group consisting of a transition metal element, element III and rare-earth element, such as Fe, Ni, Co, Cr, Mn, Ti, Ag, Ce, La, Y and Al). JP Patent Publication (kokai) No. S-61-8851 (A) (1986) discloses a Pt/Cr—Ce alloy catalyst.

The catalysts, such as Pt/Ce catalyst, the Pt/Mn catalyst, the Pt/M catalyst and the Pt/Cr—Ce alloy catalyst disclosed in JP Patent Publication (kokai) No. 2006-236927 (A), JP Patent Publication (kokai) No. 2006-102568 (A) and JP Patent Publication (kokai) No. S-61-8851 (A) (1986) did not perform satisfactorily in terms of high current density and high durability.

DISCLOSURE OF THE INVENTION

The present invention provides a fuel cell with improved durability, and in particular, with the improved capacity for power generation in a high current density region. The present invention also provides a method for producing an electrode catalyst for a fuel cell and a fuel cell with improved durability and capacity for power generation in a high current density region using said electrode catalyst for a fuel cell as a cathode catalyst and/or anode catalyst.

The present inventor found that the abovementioned problems could be resolved with the use of an alloy having a specific composition as a catalyst metal particle, thereby completing the present invention.

Specifically, the first aspect of the present invention relates to an electrode catalyst for a fuel cell comprising catalyst metal particles of a noble metal-base metal-Ce (cerium) ternary alloy carried on carbon materials. The noble metal is at least one member selected from among Pt, Ru, Rh, Pd, Ag and Au, the base metal is at least one member selected from among Ir, Co, Fe, Ni and Mn, and the relative proportion (i.e., the molar proportion) of noble metal:base metal:Ce (cerium) is 20 to 95:5 to 60:0.1 to 3.

A particularly preferable example is a Pt—Fe—Ce ternary alloy in which the noble metal is platinum (Pt) and the base metal is iron (Fe).

In the electrode catalyst for a fuel cell of the present invention, the average particle diameter of the catalyst metal particles carried on carbon materials is preferably 3 to 20 nm, and more preferably 5 to 10 nm.

The second aspect of the present invention relates to a method for producing an electrode catalyst for a fuel cell consisting of catalyst metal particles of a noble metal-base metal-Ce (cerium) ternary alloy carried on carbon materials, wherein the noble metal is at least one member selected from among Pt, Ru, Rh, Pd, Ag and Au, the base metal is at least one member selected from among Ir, Co, Fe, Ni and Mn, and the relative proportion (i.e., the molar proportion) of noble metal: base metal:Ce (cerium) is 20 to 95:5 to 60:0.1 to 3, and preferably 40 to 80:15 to 40:0.1 to 3. The method comprises steps of adding a noble metal salt, a base metal salt and a Ce (cerium) salt to a water dispersion of the carbon materials, hydroxylating the noble metal salt, the base metal salt and the Ce (cerium) salt under alkaline conditions, reducing the noble metal hydroxide, the base metal hydroxide and the Ce (cerium) hydroxide, and alloying the reduced noble metal, base metal and Ce (cerium).

In the method for producing an electrode catalyst for a fuel cell of the present invention, it is preferable that the noble metal be platinum (Pt), the base metal be iridium (Ir) and/or cobalt (Co), and the average particle diameter of the catalyst metal particles be 3 to 20 nm, with 5 to 10 nm being more preferable, as described above.

The third aspect of the present invention relates to a polymer electrolyte fuel cell using the above electrode catalyst as a cathode catalyst and/or anode catalyst. The polymer electrolyte fuel cell of the present invention involves the use of an electrode catalyst that satisfies conditions regarding high catalytic activity and excellent durability. Accordingly, the polymer electrolyte fuel cell of the present invention is excellent in terms of durability and the capacity for power generation.

According to the present invention, a noble metal-base metal-Ce (cerium) ternary alloy is used for catalyst metal particles. This can remarkably improve the capacity for power generation in a high current density region and durability of a fuel cell.

When a Pt-base metal alloy catalyst is used as a cathode catalyst, hydrogen peroxide is generated as a by-product of oxygen reduction reaction by a base metal eluted into the electrolyte during operation. The generated hydrogen peroxide is converted into hydrogen peroxide radicals, which in turn causes an electrolyte membrane to deteriorate. In order to overcome this problem, Ce is alloyed, this accelerates degradation of hydrogen peroxide, and deterioration of an electrolyte membrane can be inhibited.

Since the present invention involves alloying of Pt, a base metal and Ce, the effects of the addition of Ce can be maintained. Also, the ternary alloy can improve activity and provide effects of inhibiting alloy disintegration, compared with a case in which Ce alone is added. This can provide a catalyst satisfying conditions regarding initial performance and durability. The base metal, which is the third element to be added (except for Pt and Ce) having excellent catalytic activity, is not particularly limited. Ir and Co exhibit particularly high activity. In the present invention, a catalyst of Pt/base metal (preferably Ir and/or Co)/Ce alloy can remarkably extend the durability life of the polymer electrolyte fuel cell.

BRIEF DESCRIPTION OF THE DRAWING

FIG. 1 shows the correlation between cell voltage and the endurance time of a fuel cell using catalysts selected in examples and comparative examples.

BEST MODES FOR CARRYING OUT THE INVENTION

Hereafter, embodiments of the present invention are described in detail.

When platinum, a base metal and Ce are alloyed, halides such as chlorides and bromides, alkoxides such as methoxide and ethoxide, oxides, nitrates, and sulfides of each of platinum, a base metal and Ce can be extensively used as starting compounds comprising platinum, a base metal and Ce. Alloying can be preferably carried out by subjecting the reduced platinum component, base metal component and Ce component to heat treatment at 600 to 900° C. under an inert gas atmosphere.

Particle diameters of an alloy catalyst of platinum, a base metal and Ce are preferably 3 to 20 nm in order to realize high activity. If the particle diameter is smaller than 3 nm, particles easily induce aggregation or dissolution/reprecipitation, thereby particle size increases. If the particle diameter is greater than 20 nm, the surface area would be relatively small in relation to the amounts of alloy metal catalysts to be used. Thus, sufficient catalytic activity cannot be realized. In this respect, particle diameters of an alloy catalyst of platinum, a base metal and Ce are more preferably 3 to 15 nm.

Known carbon materials can be used as conductive carriers. Particularly preferable examples thereof include carbon black, such as channel black, furnace black, thermal black or acetylene black, and activated carbon.

When the electrode of the present invention is used for a polymer electrolyte fuel cell, either a fluorine electrolyte or a hydrocarbon electrolyte can be used as a polymer electrolyte. A fluorine polymer electrolyte is a fluorine polymer compound with an electrolyte group, such as a sulfonic acid group or carboxylic acid group. A fluorine polymer electrolyte used for the fuel cell of the present invention is a polymer comprising a fluorocarbon or hydrofluorocarbon framework with an electrolyte group, such as a sulfonic acid group. It may comprise within its molecules an ether group, chlorine, a carboxylic acid group, a phosphoric acid group or an aromatic ring. In general, a polymer having perfluorocarbon as a main chain with the sulfonic acid group through a spacer such as perfluoro ether and an aromatic ring is used. Specifically, for example, "Nafion®" manufactured by Du Pont Co., Ltd. and "Aciplex-S®" manufactured by Asahi Chemical Industry Co., Ltd. A hydrocarbon polymer electrolyte used for the fuel cell of the present invention comprises a hydrocarbon portion in any positions of a molecular chain constituting a polymer compound with an electrolyte group. Examples of electrolyte groups include a sulfonic acid group and a carboxylic acid group.

EXAMPLES

Hereafter, the present invention is described in greater detail with reference to examples and comparative examples.

Example 1

Commercially available carbon powder (5.3 g) having a high specific surface area was added to 0.5 L of pure water and dispersed therein. To this dispersion, a hexahydroxo platinum nitrate solution including 3.5 g of platinum, an iridium nitrate solution including 1.2 g of iridium and cerium nitrate including 0.05 g of cerium were added dropwise in such order, and were then thoroughly blended with the carbon. 0.1N ammonia (about 100 mL) was added thereto in order to bring the pH level to 10, thereby forming the respective hydroxides to precipitate them on the carbon. The dispersion was filtered, and the resulting powder was vacuum-dried at 100° C. for 10 hours. The resultant was kept at 400° C. for 2 hours in hydrogen gas and subjected to a reducing treatment, and the resultant was then kept at 600° C. for 10 hours in nitrogen gas to alloy it.

In the obtained carbon catalyst powder loaded with platinum alloy, the loading density of platinum was 35% by weight, the loading density of iridium was 12% by weight, and the loading density of cerium was 0.5% by weight. The atomic ratio of the powder to the relevant element was Pt:Ir:Ce=3:1:0.06. When the XRD was measured, only the peak of Pt was observed, and the formation of a solid solution of the added elements was confirmed from the peak shift in the (111) plane of Pt in the direction of high angle side at around 39° C. When the EDX was measured, the peaks of Pt, Ir and Ce were observed in the particles. Regarding the diameter of catalyst particles, the lattice constant of Pt determined from the peak position in the (111) plane of Pt via XRD was 3.906 Å, and the Pt particle diameter determined based on the half value was 5.5 nm.

Example 2

Commercially available carbon powder (5.2 g) having a high specific surface area was added to 0.5 L of pure water and dispersed therein. To this dispersion, a hexahydroxo platinum nitrate solution including 4.5 g of platinum, a cobalt nitrate solution including 0.5 g of cobalt and cerium nitrate including 0.05 g of cerium were added dropwise in such order, and were then thoroughly blended with the carbon. 0.1N ammonia (about 100 mL) was added thereto in order to bring the pH level to 10, thereby forming the respective hydroxides to precipitate them on the carbon. The dispersion was filtered, and the resulting powder was vacuum-dried at 100° C. for 10 hours. The resultant was kept at 400° C. for 2 hours in hydrogen gas and subjected to a reducing treatment, and the resultant was then kept at 800° C. for 10 hours in nitrogen gas to alloy it.

In order to remove unalloyed metal components from 10 g of the catalyst, the catalyst was agitated in 1 L of a 2 mol/L nitric acid solution, and the resultant was kept in a liquid at 60° C. for 1 hour, followed by filtering. The resulting cake was vacuum-dried at 100° C. for 10 hours to obtain catalyst powder.

In the obtained carbon catalyst powder loaded with platinum alloy, the loading density of platinum was 43% by weight, the loading density of cobalt was 3% by weight, and the loading density of cerium was 0.5% by weight. The atomic ratio of the powder to the relevant element was Pt:Co:Ce=4.1:1:0.004. When the XRD was measured, only the peak of Pt was observed, and the formation of a solid solution of the added elements was confirmed from the peak shift in the (111) plane of Pt in the direction of high angle side at around 39° C. When the EDX was measured, the peaks of Pt, Co and Ce were observed in the particles. Regarding the diameter of catalyst particles, the lattice constant of Pt determined from the peak position in the (111) plane of Pt via XRD was 3.906 Å, and the Pt particle diameter determined based on the half value was 5.9 nm.

Example 3

PtFeCe was synthesized according to the method of Example 1, using iron nitrate instead of the iridium nitrate solution.

Example 4

PtNiCe was synthesized according to the method of Example 1, using nickel nitrate instead of the iridium nitrate solution.

Example 5

PtMnCe was synthesized according to the method of Example 1, using manganese nitrate was used instead of the iridium nitrate solution.

Comparative Example 1

Commercially available carbon powder (5.3 g) having a high specific surface area was added to 0.5 L of pure water and dispersed therein. To this dispersion, a hexahydroxo platinum nitrate solution including 3.5 g of platinum and an iridium nitrate solution including 1.2 g of iridium were added dropwise in such order and were then thoroughly blended with the carbon. 0.1N ammonia (about 100 mL) was added thereto in order to bring the pH level to 10, thereby forming the respective hydroxides to precipitate them on the carbon. The dispersion was filtered, and the resulting powder was vacuum-dried at 100° C. for 10 hours. The resultant was kept at 400° C. for 2 hours in hydrogen gas and subjected to a reducing treatment, and the resultant was then kept at 800° C. for 10 hours in nitrogen gas to alloy it.

In the obtained carbon catalyst powder, the loading density of platinum was 35% by weight and the loading density of iridium was 12% by weight. The atomic ratio of the powder to the relevant element was Pt:Ir=3:1. When the XRD was measured, only the peak of Pt was observed, and the formation of a solid solution of iridium was confirmed from the peak shift in the (111) plane of Pt in the direction of high angle side at around 39° C. The lattice constant of Pt determined from the peak position in the (111) plane of Pt was 3.902 Å, and the Pt particle diameter determined based on the half value was 5.4 nm.

Comparative Example 2

The catalyst powder (10.0 g) of Comparative Example 1 was added to 0.5 L of pure water and dispersed therein. Cerium nitrate including 0.05 g of cerium was added dropwise thereto and was then thoroughly blended with the carbon. 0.1N ammonia (about 100 mL) was added thereto in order to bring the pH level to 10, thereby forming the respective hydroxides to precipitate them on the carbon. The dispersion was filtered, and the resulting powder was dried in the air at 100° C. for 15 hours.

When the XRD was measured, the peak of cerium was observed in addition to the peak of Pt. No change was observed in the catalyst particle diameter or in the peak shift.

Comparative Example 3

Commercially available carbon powder (5.2 g) having a high specific surface area was added to 0.5 L of pure water and dispersed therein. To this dispersion, a hexahydroxo platinum nitrate solution including 4.5 g of platinum and a cobalt nitrate solution including 0.5 g of cobalt were added dropwise in such order and were then thoroughly blended with the carbon. 0.1N ammonia (about 100 mL) was added thereto in order to bring the pH level to 10, thereby forming the respective hydroxides to precipitate them on the carbon. The dispersion was filtered, and the resulting powder was vacuum-dried at 100° C. for 10 hours. The resultant was kept at 400° C. for 2 hours in hydrogen gas and subjected to a reducing treatment, and the resultant was then kept at 800° C. for 10 hours in nitrogen gas to alloy it.

In order to remove unalloyed metal components from 10 g of the catalyst, the catalyst was agitated in 1 L of a 2 mol/L nitric acid solution, and the resultant was kept in a liquid at 60° C. for 1 hour, followed by filtering. The resulting cake was vacuum-dried at 100° C. for 10 hours to obtain catalyst powder.

In the obtained catalyst powder, the loading density of platinum was 43% by weight and the loading density of cobalt was 3% by weight. The atomic ratio of the powder to the relevant element was Pt:Co=4.1:1. When the XRD was measured, only the peak of Pt was observed, and the formation of a solid solution of cobalt was confirmed from the peak shift in the (111) plane of Pt in the direction of high angle side at around 39° C. The lattice constant of Pt determined from the peak position in the (111) plane of Pt was 3.846 Å, and the Pt particle diameter determined based on the half value was 5.6 nm.

Comparative Example 4

Cerium nitrate was added dropwise to the catalyst powder of Comparative Example 3 to obtain PtCo+Ce.

Comparative Example 5

PtFe was obtained according to the method of Comparative Example 1, using iron nitrate instead of iridium nitrate.

Comparative Example 6

Cerium nitrate was added dropwise to the catalyst powder of Comparative Example 5 to obtain PtFe+Ce.

Comparative Example 7

PtNi was obtained according to the method of Comparative Example 1, using nickel nitrate instead of iridium nitrate.

Comparative Example 8

Cerium nitrate was added dropwise to the catalyst powder of Comparative Example 7 to obtain PtNi+Ce.

Comparative Example 9

PtMn was obtained according to the method of Comparative Example 1, using manganese nitrate instead of iridium nitrate.

Comparative Example 10

Cerium nitrate was added dropwise to the catalyst powder of Comparative Example 9 to obtain PtMn+Ce.

The catalysts obtained in Examples and Comparative Examples above were inspected in terms of the initial performance and durability in the manner described below.

[Initial Voltage Measurement]

In order to compare catalytic performance at the initial stage, the initial voltage was measured. Characteristics of the current-voltage were measured by setting the unit cell temperature at 80° C. and supplying a humidified air, which had been passed through a bubbler heated at 60° C., to the cathode electrode with a stoichiometric ratio of 3 and humidified hydrogen, which had been passed through a bubbler heated at 60° C., to the anode electrode with a stoichiometric ratio of 3. Catalyst performances were compared by continuing the measurement until their current-voltage was stable and then comparing the results of measurement at the current density of 0.1 A/cm$^2$. The amount of Pt at each electrode was 0.3 mg/cm$^2$.

[Durability]

After the initial voltage was measured, durability was tested under the conditions described below. The unit cell temperature was set at 80° C., a humidified air, which had been passed through a bubbler heated at 60° C., was supplied to the cathode electrode with a stoichiometric ratio of 3, and humidified hydrogen, which had been passed through a bubbler heated at 60° C., was supplied to the anode electrode with a stoichiometric ratio of 3. The current values were varied from 0 CV→0.1 A/cm$^2$ every 5 seconds. The voltage values at 0.1 A/cm$^2$ were plotted and durability was compared.

Catalyst properties and cell properties of Examples 1 to 5 and Comparative Examples 1 to 10 are summarized in Table 1. Further, properties and durability of the cells of Examples 1 and 2 and Comparative Examples 1, 2, and 3 are shown in FIG. 1.

TABLE 1

| Sample | | Catalyst particle diameter (nm) | Loading density (%) | | | Cell performance @0.1 A/cm² (V) | |
|---|---|---|---|---|---|---|---|
| | | | Pt | M (third element) | Ce | Initial | After durability test (after 30,000 hrs) |
| Example 1 | PTIrCe | 5.5 | 35.0 | 12.0 | 0.5 | 763 | 746 |
| Example 2 | PtCoCe | 5.9 | 43.0 | 3.0 | 0.5 | 775 | 740 |
| Example 3 | PtFeCe | 6.1 | 45.5 | 4.6 | 0.5 | 788 | 772 |
| Example 4 | PtNiCe | 5.7 | 44.2 | 3.4 | 0.5 | 768 | 736 |
| Example 5 | PtMnCe | 6.0 | 47.6 | 2.9 | 0.5 | 778 | 741 |
| Comparative Example 1 | PtIr | 5.4 | 35.0 | 12.0 | — | 733 | 676 |
| Comparative Example 2 | PtIr + Ce | 5.4 | 35.0 | 12.0 | 0.5 | 725 | 703 |
| Comparative Example 3 | PtCo | 5.6 | 43.0 | 3.0 | — | 778 | 651 |
| Comparative Example 4 | PtCo + Ce | 5.6 | 43.0 | 3.0 | 0.5 | 767 | 724 |
| Comparative Example 5 | PtFe | 5.7 | 45.5 | 4.6 | — | 784 | 631 |
| Comparative Example 6 | PtFe + Ce | 5.7 | 45.5 | 4.6 | 0.5 | 772 | 726 |
| Comparative Example 7 | PtNi | 5.3 | 43.0 | 3.4 | — | 762 | 636 |
| Comparative Example 8 | PtNi + Ce | 5.3 | 43.0 | 3.4 | 0.5 | 757 | 704 |
| Comparative Example 9 | PtMn | 5.6 | 44.8 | 2.9 | — | 773 | 637 |
| Comparative Example 10 | PtMn + Ce | 5.6 | 44.8 | 2.9 | 0.5 | 773 | 697 |

Based on the results shown in Table 1 and FIG. 1, the PtCo catalyst (Comparative Example 3) was found to show a lowered voltage after the durability test. This is considered to result from lowered catalyst activity due to separation of a Co solid solution and deterioration of an electrolyte membrane due to elusion of Co into the membrane. When the state of the PtCo catalyst in the catalyst layer after the durability test was actually verified by XRD, the lattice constant was found to be increased due to Co elution, compared with the lattice constant at the initial stage.

The catalyst consisting of only PtIr (Comparative Example 1) did not show significant separation of an Ir solid solution, although lowering of the voltage was observed. This is considered to result from deterioration of an electrolyte membrane caused by hydrogen peroxide generated during the durability test.

Further, a catalyst that additionally comprises Ce (Comparative Example 2) does not show significant lowering in the voltage as a result of the addition of Ce (i.e., hydrogen peroxide degradation), catalyst activity is low, and satisfactory performance cannot be attained.

However, ternary alloy in Examples 1 and 2 was found to yield improved voltage and durability. It would appear that these significant effects were caused by the improved catalyst activity and durability of the ternary alloys. In particular, the inhibiting effects of deterioration of an electrolyte membrane caused by degradation of hydrogen peroxide obtained by alloying Ce and the inhibiting effects of separation of an alloy solid solution caused by preparing a ternary alloy are characteristics of the catalyst of the present invention. The initial state and the state after the durability test of the catalysts of Examples 1 and 2 in the catalyst layer were compared by XRD. As a result, the lattice constant did not substantially change, and separation of an alloy solid solution was not observed. When Examples 1 and 2 were compared, Example 1 showed higher alloy stability due to the effects of Ir addition. Thus, the catalyst of Example 1 can be regarded as a catalyst with high durability.

Examples 3 to 5 show catalyst performances of ternary alloys prepared with the use of Fe, Ni, or Mn as a base metal instead of Ir or Ce. As in the case of Examples 1 and 2, these ternary alloys show improved initial performance and durability. Comparative Examples 5, 7 and 9 show the initial performance and durability of each element in terms of the binary system. Comparative Examples 4, 6, 8 and 10 show the initial performance and durability of each element in terms of the binary system and the system with the addition of Ce. In Comparative Examples 5, 7 and 9, lowered performance (i.e., lowered voltage) after the durability test was observed due to the lack of Ce addition. Further, Comparative Examples 4, 6, 8 and 10 show insufficient catalyst activity caused by unalloying of Ce.

According to the present invention, Fe was found to be the most preferable metal used for M (M=metal) in the PtMCe catalyst. In the past, Fe was known to have had high catalyst activity and high initial performance; however, it could not attain satisfactory durability due to the accelerated deterioration of an electrolyte and lowered performance. Such drawbacks could be overcome with the addition of Pt, Fe, and Ce to prepare ternary alloys. Thus, the PtFeCe catalyst has high durability and excellent activity.

INDUSTRIAL APPLICABILITY

The present invention provides a catalyst having both initial performance and durability by having the effects of the improved activity and inhibition of alloy disintegration realized by the preparation of ternary alloys of Pt, a base metal and Ce. Thus, the present invention contributes to practical applications and spreading of fuel cells.

The invention claimed is:

1. An electrode catalyst for a fuel cell comprising catalyst metal particles of noble metal-base metal-Ce (cerium) ternary alloy carried on carbon materials, wherein the noble metal is at least one member selected from among Pt, Ru, Rh, Pd, Ag and Au, the base metal is at least one member selected from among Ir, Co, Fe, Ni and Mn, and the relative proportion (i.e., the molar proportion) of the noble metals:base metal:Ce (cerium) is between 20 to 95:5 to 60:0.1 to 3.

2. The electrode catalyst for a fuel cell according to claim 1, wherein the noble metal is platinum (Pt) and the base metal is iron (Fe).

3. The electrode catalyst for a fuel cell according to claim 1, wherein the average particle diameter of the catalyst metal particles is 3 to 20 nm.

4. A method for producing an electrode catalyst for a fuel cell, wherein catalyst metal particles consisting of a noble metal-base metal-Ce (cerium) ternary alloy are carried on carbon materials, the noble metal is at least one member selected from among Pt, Ru, Rh, Pd, Ag and Au, the base metal is at least one member selected from among Ir, Co, Fe, Ni and Mn, and the relative proportion (i.e., the molar proportion) of the noble metal:base metal:Ce (cerium) is 20 to 95:5 to 60:0.1 to 3, the method comprising steps of adding a noble metal salt, a base metal salt and a Ce (cerium) salt to a water dispersion of the carbon materials, hydroxylating the noble metal salt, the base metal salt and the Ce (cerium) salt under alkaline conditions, reducing the noble metal hydroxide, the base metal hydroxide and the Ce (cerium) hydroxide, and alloying the reduced noble metal, base metal and Ce (cerium).

5. The method for producing an electrode catalyst for a fuel cell according to claim 4, wherein the noble metal is platinum (Pt), and the base metal is iridium (Ir) and/or cobalt (Co).

6. The method for producing an electrode catalyst for a fuel cell according to claim 4, wherein the average particle diameter of the catalyst metal particles is 3 to 20 nm.

7. A polymer electrolyte fuel cell comprising the electrode catalyst according to claim 1 as a cathode catalyst and/or anode catalyst.

* * * * *